G. E. CLEVELAND.
GLASS SHEARING AND BATCH OBTAINING MECHANISM.
APPLICATION FILED APR. 28, 1915.
1,199,665.
Patented Sept. 26, 1916.
2 SHEETS—SHEET 2.
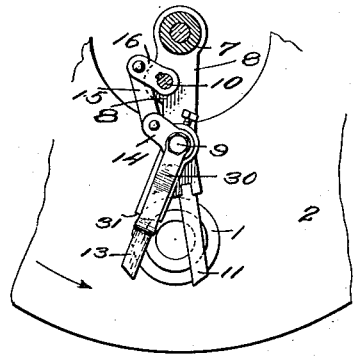
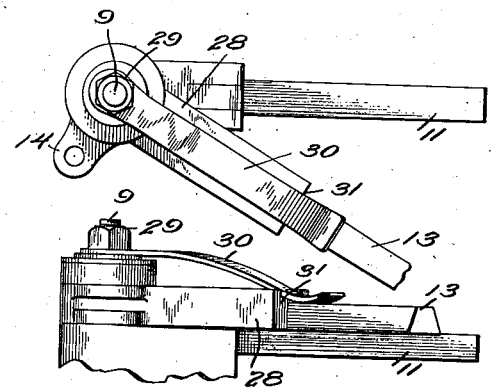
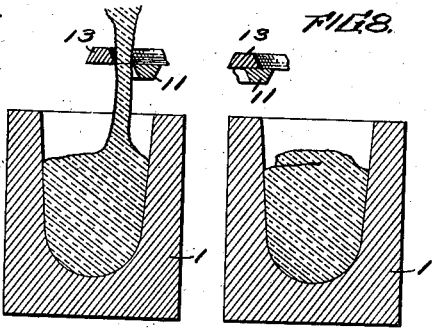
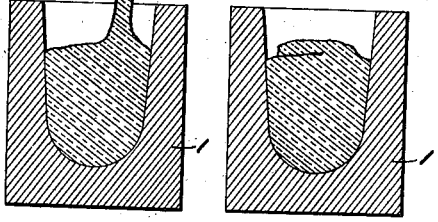
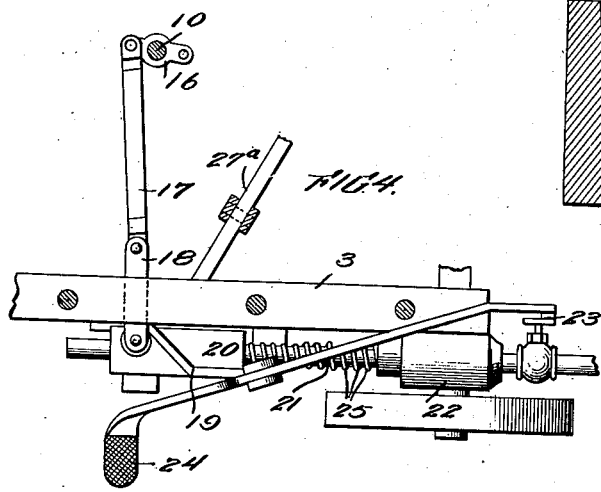
Inventor
George E. Cleveland.
Witnesses

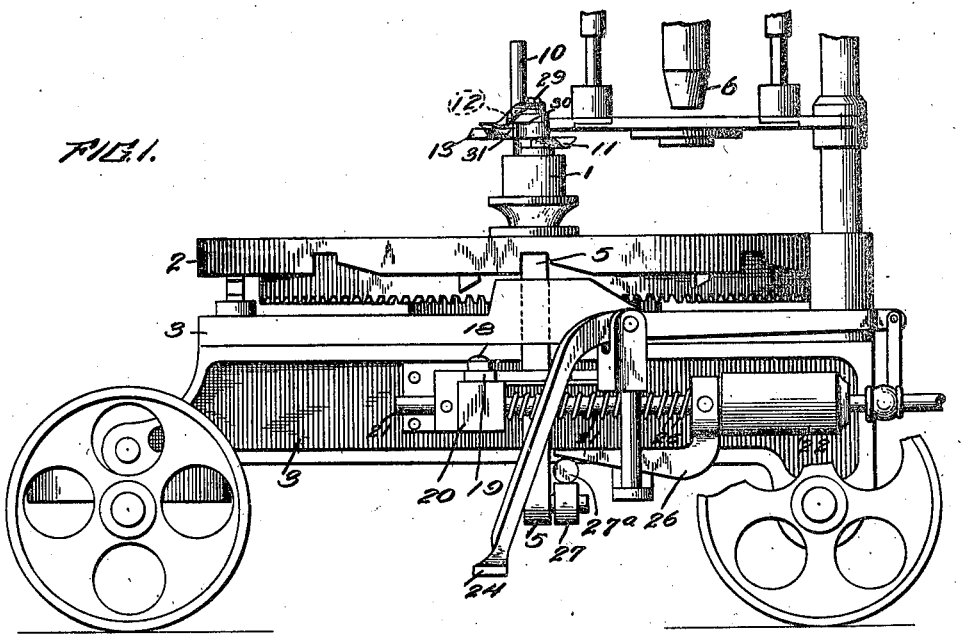
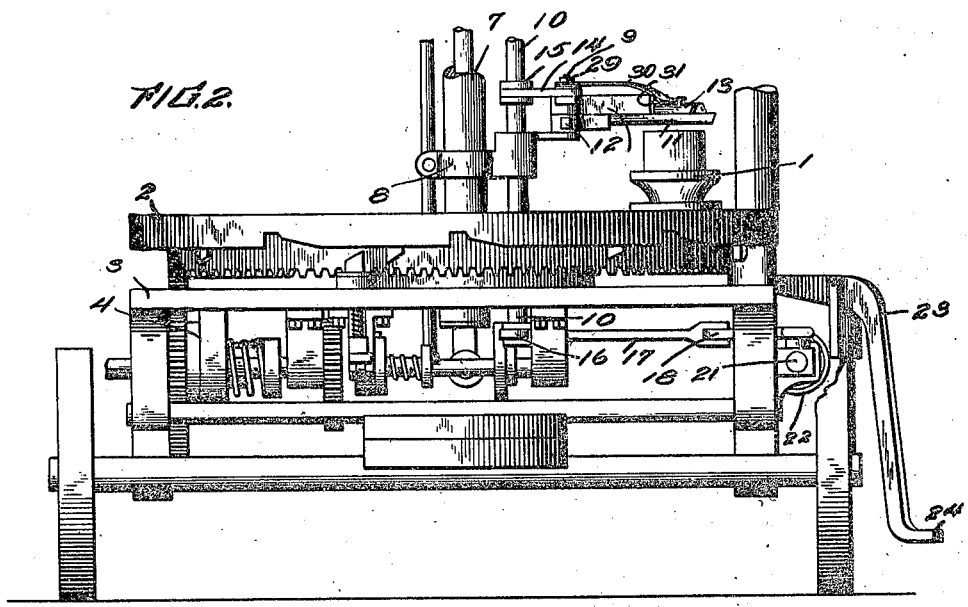

UNITED STATES PATENT OFFICE.

GEORGE E. CLEVELAND, OF FAIRMOUNT, INDIANA, ASSIGNOR TO CLEVELAND MACHINE COMPANY, A CORPORATION OF INDIANA.

GLASS SHEARING AND BATCH-OBTAINING MECHANISM.

1,199,665.  Specification of Letters Patent.  Patented Sept. 26, 1916.

Original application filed November 24, 1913, Serial No. 802,740. Divided and this application filed April 28, 1915. Serial No. 24,598.

*To all whom it may concern:*

Be it known that I, GEORGE E. CLEVELAND, a citizen of the United States of America, and a resident of Fairmount, Indiana, have invented certain new and useful Improvements in Glass Shearing and Batch-Obtaining Mechanisms, of which the following is a specification.

This invention has for its object to provide means for severing a stream of glass flowing from a furnace, ladle or iron, and depositing severed portions of such streams in molds with the severed end of each batch so segregated in such position in the mold that the chilled portion of the glass formed at the severed end of the batch will be, upon the subsequent pressing of the batch, reheated from the batch of glass, or, will be at a point where it will form no part of the article to be finished from the batch, or will be in such position in such article as to be unobjectionable.

It comprises a novel arrangement of a shear mechanism, a traveling mold, and a common actuating mechanism for the two, whereby the action of the severing mechanism is properly correlated to the movement of the mold to cause the severed end of the glass stream to fall as desired.

It further consists in the construction, arrangement and combination of the several parts of which it is contained, as will be hereinafter more fully described and claimed.

My present invention in glass-shearing mechanisms is shown in the accompanying drawings as adopted for use in connection with the glass press described and claimed in my other application filed November 24, 1913, Serial No. 802,740, its purpose in such assemblage being to sever a stream of glass and to deposit the batch of glass so severed in the proper manner in a mold for subsequent pressing. I will, in the present application, refer only to such parts of the machine of the prior application as seem necessary to an understanding of the present invention, and by a description of certain details of such machine I do not intend to limit my invention thereto, such description being here given merely for a better understanding of the present invention.

With the above understanding of the purpose of the showing here made, the invention will be described in connection with the accompanying drawings in which corresponding parts are designated by similar marks of reference and in which,—

Figure 1 is a fragmental side elevation of a glass press having my invention applied thereto. Fig. 2 is an end view thereof. Fig. 3 is a fragmental plan view thereof showing the shearing mechanism. Fig. 4 is a fragmental horizontal sectional view thereof showing the shear-acting mechanism. Fig. 5 is a detail plan view showing my invention in the construction of the shearing mechanism. Fig. 6 is an elevation thereof. Figs. 7 and 8 are details illustrating a relation existing between the shearing point and the mold forming the subject-matter of a claim hereof.

In these drawings, 1 represents a press mold mounted on a turn-table 2, supported by a base 3, and driven through a friction drive 4 and suitable gearing. The table may be held against motion due to the friction drive by the engagement with the table of a locking bolt 5, which may be withdrawn by mechanism to be hereinafter described, to permit the table to move to bring the mold under a press plunger 6.

Adjustable vertically, and circumferentially, upon a central, non-turning column 7, arising from the base 3 through the center of the turn-table is a clamp bracket 8, carrying a vertical stud 9, and serving as the upper bearing of a vertical shaft 10, which passes therethrough.

The members of the shearing mechanism, which is in the form of a pair of shears, are carried by the stud 9. One of these members, viz., the fixed blade 11, is adjustable around the stud 9 and may be locked in any desired angular position therearound, as by a set screw 12, it having, by preference, both its back and front edges so shaped that either can be used as the severing edge. The other member, viz., the movable blade 13, is sleeved on the stud 9, and has a laterally extending crank arm 14 thereon, connected by a link 15 to a crank 16 feathered on the shaft 10 above the bracket.

The lower end of the shaft 10 has keyed thereon a cross head 16, either end of which may be connected by a link 17 with a slide 18 mounted for in and out movement in the side of the base frame. By changing the connection of the link between the opposite ends of the cross head 16, and by making a corresponding angular adjustment of the fixed knife on the upper end of the stud 9, the movable knife may be made to cut toward the front or rear edge of the fixed blade.

The outer end of the slide 18 coöperates with a cam-way 19 formed on a block 20 carried by a piston-rod 21, working in a fluid-pressure cylinder 22, the controlling valve 23 of which is actuated by a pedal 24. The piston rod is normally held to the inner limit of its stroke in the cylinder by a spring 25. The actuation of the piston-rod by the fluid pressure results in an outward movement of the slide 18, and a movement of the movable blade toward the fixed blade and thus in the severing of any stream of glass that may be flowing into the mold between the two members of the severing mechanism.

The piston rod has adjustably mounted thereon a cam-plate 26, which, on the outward stroke of the piston-rod, depresses one end of a pivoted lever 27ª and acting therethrough, depresses the bolt 5, to withdraw the latter from the turn-table, the end of the lever for this purpose being located above a stud roller 27 on the lower end of the bolt.

A preferred construction of the shears is one in which the movable blade is mounted in a holder 28, which is sleeved on the stud 9, the stud having on its upper end a nut 29. A spring plate 30 has its one end encircling the stud between the upper face of the holder and the lower side of the nut 29, the natural set of the spring plate being such that its rear end rests on the holder immediately in around the pivotal point, while its other end rests on the movable blade at a point which is approximately opposite the shearing point. Intermediate of its length the spring lies within a notch 31 located in the upper face of the holder, and on the end thereof, whereby the end of the spring is maintained in proper relation to the blade. By means of the nut, the spring may be flexed from its natural set, and thus the pressure exerted by it on the movable blade to hold the latter against the fixed blade may be varied. It will be seen that the pressure due to the nut, is exerted on the one hand on the blade near the cutting point, and on the other hand at the pivotal point. Thus the cutting portions of the blade are held in contact, and the movable blade is not subjected to equal and balancing pressure on both sides of its pivotal points.

By the adjustment of the fixed blade around the stud by which it is carried, the point at which the glass is severed may be shifted circumferentially of the table and in respect to the stop position of the mold, that is to say, the glass may be cut above the center of the mold or to either side thereof. Figs. 7 and 8 show a preferred relation. Fig. 7 shows the mold at rest beneath the shears. In this position as seen, the severing edge of the fixed blade is close to the advance side of the mold and the glass is fed into the mold close to such sides. The connecting mechanism between the table clutch dog and the severing mechanism and the pedal is so arranged that the table is free to move about the instant the glass is severed. The subsequent movement of the mold in the direction of the arrow, (Fig. 8) will then cause the severed end of the glass stream to fall across the top of the glass in the mold as shown in that figure, and if the height of the shears is properly adjusted in respect to the movement of the table, the stream of glass will be so laid in the mold that the severed end thereof will not be in contact with the rear wall of the mold. It is important that such end does not come into contact with the mold wall as it might be thereby further chilled to such an extent as would leave a mark in the finished article. On the other hand, while the severed end of the glass is chilled to a certain extent by the shears, this chilling is not sufficient, in the case of many finished articles, to prevent the reheating of the sheared end if it is not further chilled, and is so placed that it will, in a subsequent pressing, be worked into the mass of the glass. By feeding the glass close to the forward wall of the mold, and moving the mold forward, the glass end is prevented from falling against such side of the mold, which might happen if the mold was not fed immediately after the severing, even though the glass be fed in the center, and at the same time advantage is taken of the full diameter of the mold across which to lay the severed end.

In certain work, as in pressing hollow blanks or articles open at one end, the ability, resulting from the arrangement before described, to control the dropping of the severed end of the glass stream, may be taken advantage of to cause such end to fall on the batch in the mold in such position, that such end will not form any part of the articles to be finally finished from the batch, or the end may be so located in the finished article that the mark produced thereby will not be objectionable. Thus if a blank for a lantern globe be pressed from a glass batch having the severed end deposited thereon as in Fig. 8, the severed end will be in that part of the blank which will form no part of the globe as blown and finished.

Having thus described my invention, what I claim and desire to secure by Letters Patent is:—

1. In a glass severing and batch-obtaining mechanism, the combination of a glass shearing mechanism, of a movable press mold having a position of rest with the cutting point of the shearing mechanism over and forward of the center of mold, and means for actuating the shearing mechanism, and means for moving the mold, the said means being so correlated that the end of severed glass is laid across the mold by the movement thereof.

2. In a glass pressing device, the combination with a rotating mold-engaging table, a knife adjustable circumferentially of the table, a movable knife coöperating thereon, means for actuating the movable knife, and means for reversing the cutting movement thereof whereby it may act in conjunction with either edge of the adjustable blade.

In testimony whereof I hereunto affix my signature in the presence of two witnesses.

GEORGE E. CLEVELAND.

In the presence of—
XENTT EDWARDS,
GARR KNIGHT.